United States Patent [19]

Huang

[11] Patent Number: 6,095,956
[45] Date of Patent: Aug. 1, 2000

[54] TENSILE CORD CONNECTOR OF CHEST PULL

[76] Inventor: Tzu-Shien Huang, P.O. Box 453, Taichung, Taiwan

[21] Appl. No.: 09/252,644

[22] Filed: Feb. 19, 1999

[51] Int. Cl.[7] ........................................................ C14L 4/00
[52] U.S. Cl. .......................... 482/121; 482/126; 482/148; 248/56
[58] Field of Search .............................. 24/115.11, 129 D, 24/129 R; 248/56, 73; 482/121, 126, 148

[56] References Cited

U.S. PATENT DOCUMENTS

| | | | |
|---|---|---|---|
| 2,506,274 | 5/1950 | Maxwell et al. | 24/129 |
| 2,870,506 | 1/1959 | Hodkins et al. | 24/129 |
| 4,919,370 | 4/1990 | Martin et al. | 24/129 |

Primary Examiner—Jerome Donnelly
Attorney, Agent, or Firm—Harrison & Egbert

[57] ABSTRACT

A connector device for use on a body building apparatus having a body with an opening formed in one end of the body and extending into the body. The connector device has first and second holes extending longitudinally through the body in parallel relationship therewith. Each of the first and second holes has a side communicating with the opening. The central opening has inclined walls extending inwardly from the one end of the body and opposite sides of the opening. A partition extends between the first and second holes transverse to a longitudinal axis of the holes. The partition is located at an end of the opening inwardly of the one end of the body. The partition has a protrusion extending from a surface thereof This protrusion has a pointed end spaced from the inclined walls of the opening. A tensile cord extends through the first and second holes so as to have a portion engaged over the pointed end of the protrusion and residing between the inclined walls of the opening.

1 Claim, 4 Drawing Sheets

A—A剖視

TENSILE CORD CONNECTOR OF CHEST PULL

FIELD OF THE INVENTION

The present invention relates generally to a body building device, and more particularly to a tensile cord connector of the body building device.

BACKGROUND OF THE INVENTION

The conventional chest pull has a tensile cord which can be stretched to provide a body building effect. The tensile cord is connected at opposite ends to respective connectors which are made of a steel material. Both ends of the tensile cord are fastened fixedly with the steel connectors such that the tensile cord cannot be adjusted in length, thereby resulting in a great deal of inconvenience to the user of the conventional chest pull.

SUMMARY OF THE INVENTION

It is therefore the primary objective of the present invention to provide a body building device with a tensile cord connector which is free from the drawback of the conventional tensile cord connector described above.

It is another objective of the present invention to provide a body building device with a tensile cord connector which enables the tensile cord to be adjusted in length easily and quickly.

The objectives, features, functions, and advantages of the present invention will be readily understood upon a thoughtful deliberation of the following detailed description of a preferred embodiment of the present invention with reference to the accompanying drawings.

BRIEF DECSRIPTION OF THE DRAWINGS

DETAILDE DESCRIPTION OF THE EMBODIMENT

Figure 1:
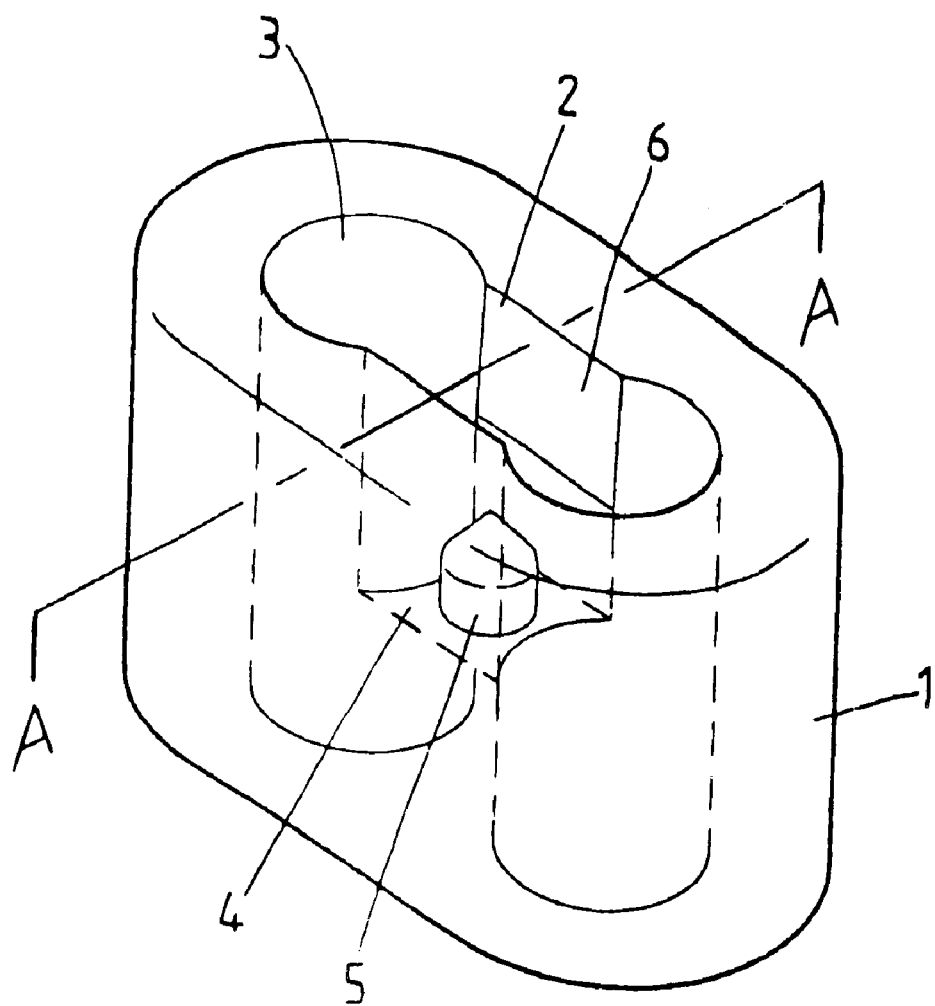
FIG. 1 shows a perspective view of the preferred embodiment of the present invention.
Figure 2:
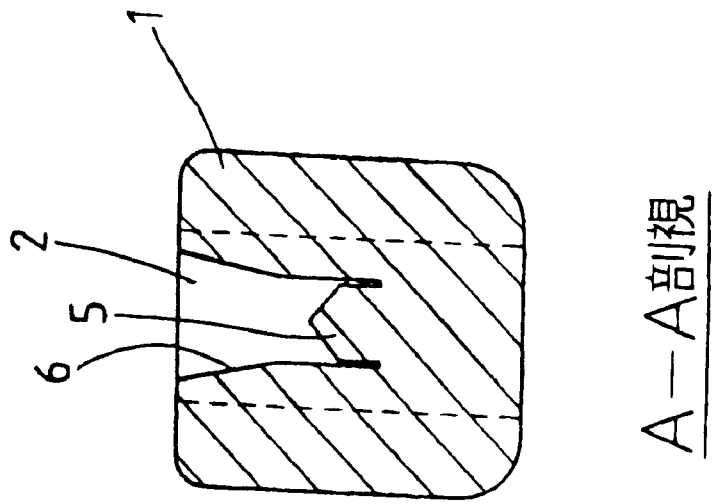
FIG. 2 shows a sectional view of the preferred embodiment of the present invention.
Figure 3:
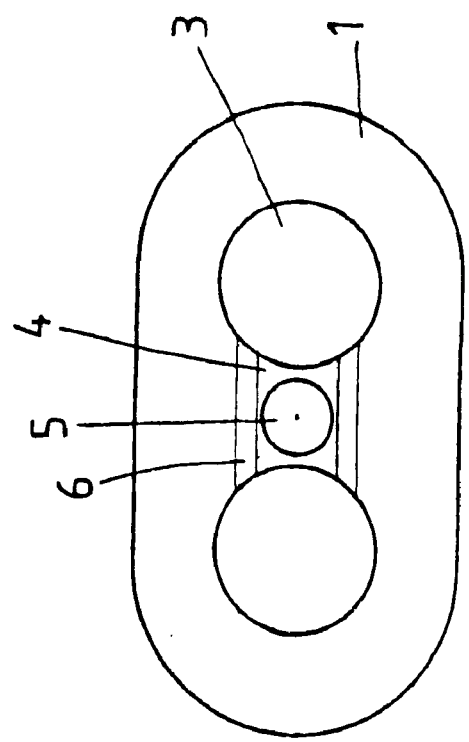
FIG. 3 shows a top view of the preferred embodiment of the present invention.
Figure 4:
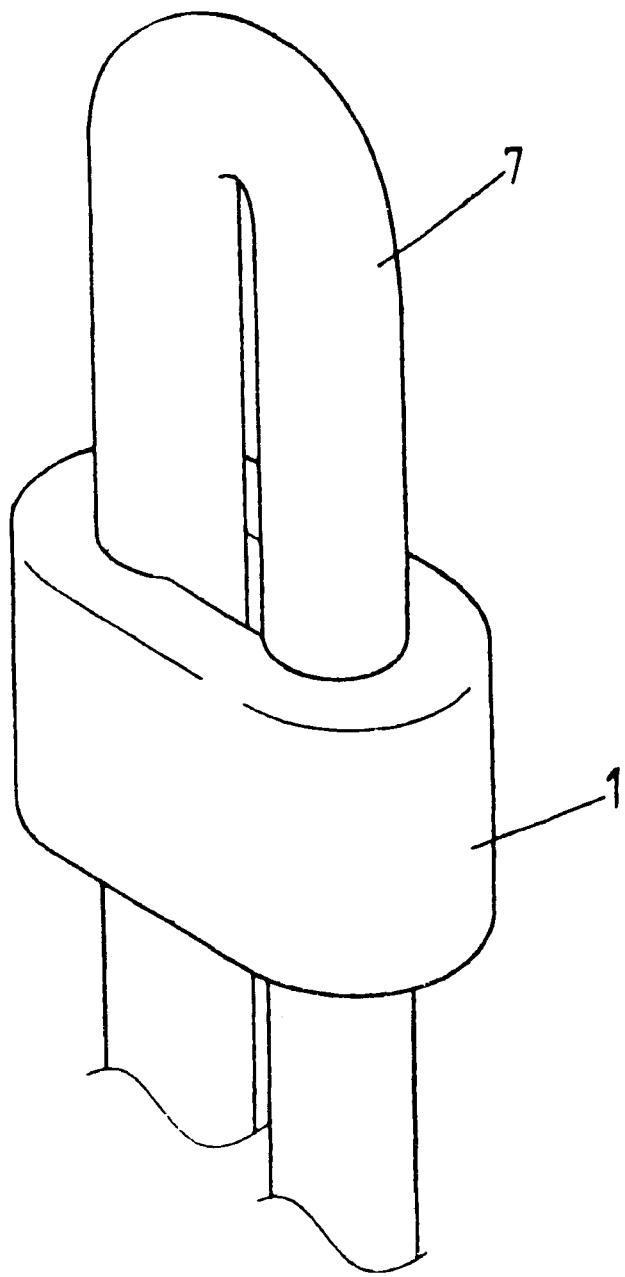
FIG. 4 shows a schematic view of the preferred embodiment of the present invention at work.
Figure 5:
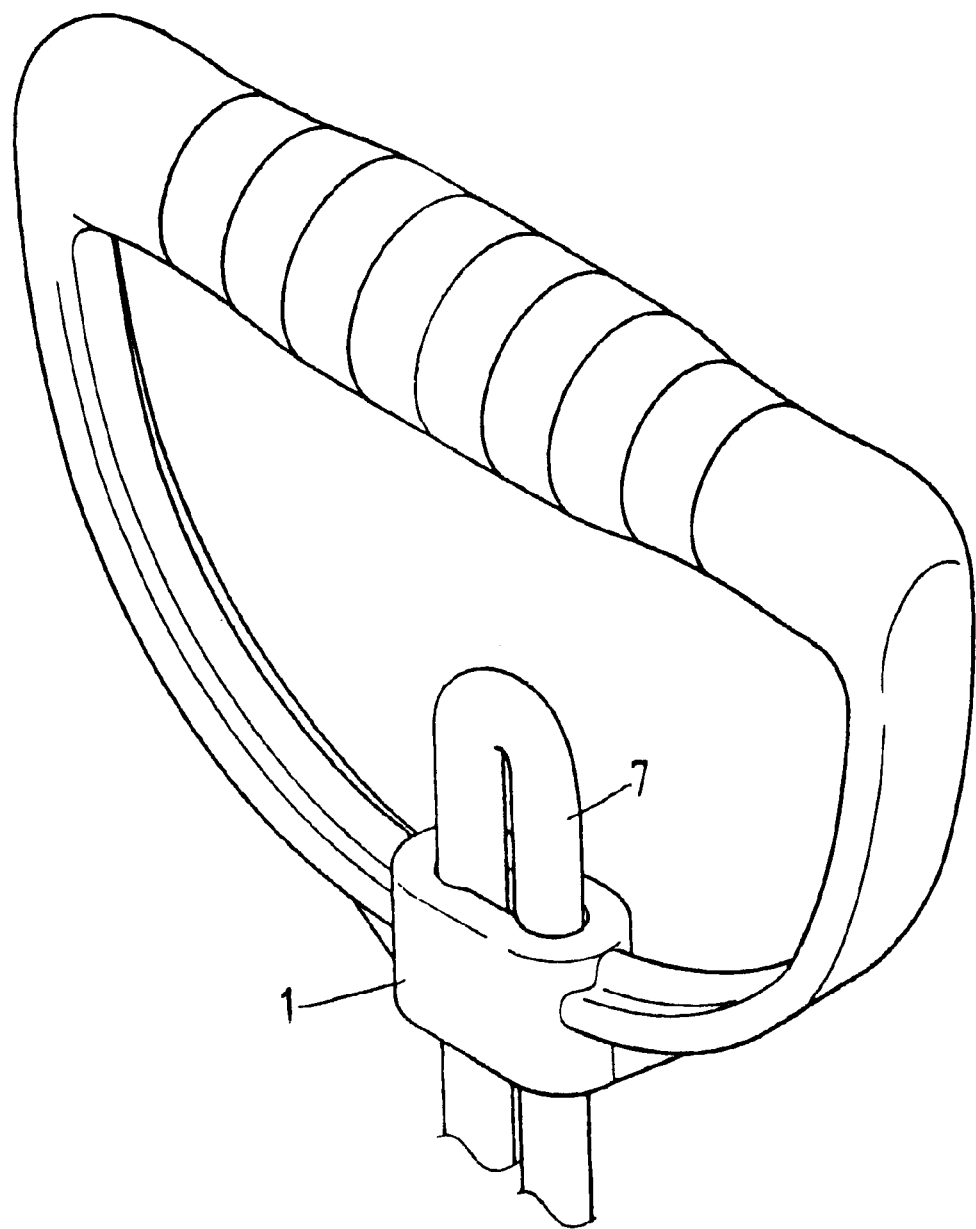
FIG. 5 shows another schematic view of the preferred embodiment of the present invention at work.

As shown in all drawings provided herewith, a tensile cord connector embodied in the present invention has a body 1 which is provided with a oneining 2, two holes 3 extending from opposite sides of the opening 2, and a partition 4 located between the two holes 3. The partition 4 is provided at the top thereof with a pointed protrusion 5. The opening 2 is provided with an inclined clamp wall 6.

A tensile cord 7 is fastened with the body I of the tensile cord connector of the present invention such that one end of the tensile cord 7 is put through one of the holes 3, and that the one end of the tensile cord 7 is then extended through the other of the holes 3 via the first hole 2. When one end of the tensile cord 7 is pulled, the curved portion of the tensile cord 7 is caused to slide along the inclined clamp wall 6 such that the tensile cord 7 is caught and engaged with the pointed protrusion 5. The tensile cord 7 can be adjusted in length by pushing one end of the tensile cord 7 upward such that the tensile cord 7 is set free from the pointed protrusion 5 and the clamp wall 6. The tensile cord 7 is once again fastened with the body 1 of the tensile cord connector in accordance with the fastening procedure described above.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

I claim:

1. A connector device for use on a body building apparatus comprising:

a body having an opening formed on one end of said body and extending into said body, said body having a first hole and a second hole extending longitudinally in parallel relation through said body on opposite sides of said opening, each of said first and second holes having a side communicating with said opening, said central opening having inclined walls extending inwardly from said one end of said body on opposite sides of said opening;

a partition extending between said first and second holes transverse to a longitudinal axis of at least one of said first and second holes, said partition located at an end of said opening inwardly of said one end of said body, said partition having a protrusion extending from a surface thereof, said protrusion having a pointed end spaced from said inclined walls of said opening; and a tensile cord extending through said first and second holes so as to have a portion engaged over said pointed end of said protrusion, said portion of said tensile cord residing between said inclined walls within said opening.

* * * * *